(12) United States Patent
Moreau et al.

(10) Patent No.: US 11,420,884 B2
(45) Date of Patent: Aug. 23, 2022

(54) IRRADIATION DEVICE FOR IRRADIATION REACTOR FOR TREATING A FLUID AND IRRADIATION REACTOR

(71) Applicant: Merck Patent GmbH, Darmstadt (DE)

(72) Inventors: Laurent Moreau, Versailles (FR); Pascal Roitel, Strasbourg (FR)

(73) Assignee: Merck Patent GmbH

( * ) Notice: Subject to any disclaimer, the term of this patent is extended or adjusted under 35 U.S.C. 154(b) by 0 days.

(21) Appl. No.: 16/753,958

(22) PCT Filed: Oct. 15, 2018

(86) PCT No.: PCT/EP2018/077989
§ 371 (c)(1),
(2) Date: Apr. 6, 2020

(87) PCT Pub. No.: WO2019/076780
PCT Pub. Date: Apr. 25, 2019

(65) Prior Publication Data
US 2020/0354236 A1    Nov. 12, 2020

(30) Foreign Application Priority Data

Oct. 17, 2017  (EP) ...................................... 17290130

(51) Int. Cl.
*C02F 1/32* (2006.01)
*C02F 103/04* (2006.01)

(52) U.S. Cl.
CPC .......... *C02F 1/325* (2013.01); *C02F 2103/04* (2013.01); *C02F 2201/004* (2013.01);
(Continued)

(58) Field of Classification Search
CPC ...... C02F 1/32; C02F 1/72; C02F 1/78; C02F 1/48; C02F 1/46; A61L 2/10; B01D 32/34; B01D 61/10; B01D 61/08
See application file for complete search history.

(56) References Cited

U.S. PATENT DOCUMENTS

| 2015/0129776 A1 | 5/2015 | Boodaghians et al. |
| 2016/0107904 A1 | 4/2016 | Rajagopalan et al. |
(Continued)

FOREIGN PATENT DOCUMENTS

| CN | 105228956 A | 1/2016 |
| CN | 106745480 A * | 5/2017 |
(Continued)

OTHER PUBLICATIONS

International Search Report and Written Opinion dated Nov. 16, 2018 in corresponding PCT application No. PCT/EP2018/077989.
(Continued)

*Primary Examiner* — Walter D. Griffin
*Assistant Examiner* — Cameron J Allen
(74) *Attorney, Agent, or Firm* — Nields, Lemack & Frame, LLC

(57) ABSTRACT

The invention provides an irradiation device (1) designed to be mounted to an irradiation reactor (20), comprising: an irradiation source (2), preferably an UV-LED, mounted on a heat conductive substrate (3); a disk-like heat sink (4) configured to removably receive the conductive substrate (3) such that heat transfer from the substrate (3) to the heat sink (4) is possible at a contact surface (4a) and such that the irradiation from the irradiation source (2) can pass through
(Continued)

an opening (5) of the heat sink (4) into aninterior volume (21) of the irradiation reactor (20) when the irradiation device (1) is mounted to the irradiation reactor (20), wherein the opening (5) of the heat sink (4) is closed by a quartz window (6); fixation means (7) releasably biasing the substrate (3) against the contact surface (4*a*) of the heat sink (4); and a fluid channel (8) extending along and/or through the heat sink (4), wherein the fluid channel (8) is arranged to communicate with a fluid inlet or outlet port (22) of the irradiation reactor (20) and with one or more outlet openings (9) for discharging the fluid into the interior volume (21) of the irradiation reactor (20) or with one ore more inlet openings (9) for feeding the fluid from the interior volume (21) of the irradiation reactor (20) into the fluid channel (8).

20 Claims, 3 Drawing Sheets

(52) U.S. Cl.
CPC ............ *C02F 2201/3222* (2013.01); *C02F 2201/3228* (2013.01); *C02F 2301/024* (2013.01); *C02F 2307/14* (2013.01)

(56) References Cited

U.S. PATENT DOCUMENTS

| | | | |
|---|---|---|---|
| 2017/0057841 A1* | 3/2017 | Blood | C02F 1/002 |
| 2018/0155215 A1 | 6/2018 | Torii | |
| 2018/0257953 A1 | 9/2018 | Mochizuki et al. | |

FOREIGN PATENT DOCUMENTS

| | | | |
|---|---|---|---|
| CN | 106745480 A | 5/2017 | |
| EP | 2999667 A1 * | 3/2016 | C02F 1/325 |
| EP | 2999667 A1 | 3/2016 | |
| WO | 2014/187524 A1 | 11/2014 | |
| WO | 2017/043357 A1 | 3/2017 | |
| WO | 2017/099033 A1 | 6/2017 | |

OTHER PUBLICATIONS

Chinese communication, with English translation, dated Feb. 14, 2022 in corresponding Chinese patent application No. 201880067992.6.

\* cited by examiner

IRRADIATION DEVICE FOR IRRADIATION REACTOR FOR TREATING A FLUID AND IRRADIATION REACTOR

This invention concerns an irradiation device for an irradiation reactor for treating a fluid, preferably water that is stored in or circulates through an internal volume of the reactor and is treated by irradiation in a wave length suitable to control the growth of bacteria and/or total organic carbon (TOC). The invention also concerns an irradiation reactor including the irradiation device.

The preferred field of application of the invention is water purification, preferably in a laboratory water purification system for producing ultrapure water.

PRIOR ART

A water purification reactor of the type to which the present invention pertains aims at producing purified water for use in laboratories and it commonly comprises a reactor body including a fluid inlet port for the fluid to be treated and a fluid outlet port for the treated fluid and an irradiation device mounted to the reactor body such that the irradiation is introduced into the fluid stored in or circulating through the irradiation reactor.

Prior art irradiation devices are commonly provided with a mercury-based lamp emitting UV radiation with a wavelength of 254 nm to control the growth of bacteria in a water purification system. These low pressure mercury discharge lamps are typically integrated in a quartz cylinder which is incorporated in a reactor body made from stainless steel so as to expose the water circulating in the reactor body with the radiation. The lamp power is calculated under consideration of the internal volume of the reactor body and the water flow rate to ensure that all bacteria will be inactivated by receiving a critical minimal radiation dose.

However, as mercury is considered environmentally unfriendly, alternative UV light sources have emerged over the last years. Among them UV-C light sources emitting radiation in the ultraviolet range from 265 to 285 nm and realised as LED light sources are used more frequently. An UV LED light source typically comprises a fixed substrate and UV LED circuit. The power of a typical LED suitable for use in such an irradiation reactor in a laboratory water purification system is in the range of 1 to 12 watt. The majority of the power is dissipated in heat and the heat removal and maintaining of the LED temperature to a maximum of 85° C. is necessary to ensure proper radiation of the LED and maintaining its efficient lifetime which would otherwise be degraded quickly.

Available cooling concepts are dissipation of the heat to external air. The approach can be difficult or insufficient where ambient temperatures are high. Therefore, in the former approach the sizing of heat sinks to achieve the required temperature dissipation may lead to expensive and large-sized heat sinks plus active fan cooling.

From a cooling standpoint two types of LEDs are available on the market, one where the heat is dissipated via the optic element, and the other one where the heat is dissipated via a substrate or a copper pad.

Further, since the LED has a limited lifetime that is in any case shorter than that of the irradiation reactor in which it is used, it requires periodical replacement which can lead to increased maintenance cost and encounters problems that the fluid-tightness of an irradiation reactor is to be secured even after the maintenance and replacement of the light source. Another aspect is the avoiding of contamination of parts of the irradiation reactor that are exposed to the fluid to be treated.

OBJECT OF THE INVENTION

It is therefore an object of the present invention to provide an irradiation device for an irradiation reactor for treating a fluid and an irradiation reactor, preferably for use in a water purification system designed to produce pure and ultrapure water for laboratory environments, which is improved at least with respect to some of the deficiencies outlined above.

SOLUTION

To solve this problem the invention provides an irradiation device for an irradiation reactor and an irradiation reactor including the features set forth in the claims. Preferred embodiments of the irradiation device and of the reactor are defined in the dependent claims.

The invention thus provides an irradiation device designed to be mounted to an irradiation reactor, comprising:
an irradiation source, preferably an UV-LED, mounted on a heat conductive substrate;
a disk-like heat sink configured to removably receive the conductive substrate such that heat transfer from the substrate to the heat sink is possible at a contact surface and such that the irradiation from the irradiation source can pass through an opening of the heat sink into an interior volume of the irradiation reactor when the irradiation device is mounted to the irradiation reactor, wherein the opening of the heat sink is closed by a quartz window;
fixation means releasably biasing the substrate against the contact surface of the heat sink; and
a fluid channel extending along and/or through the heat sink, wherein the fluid channel is arranged to communicate with a fluid inlet or outlet port of or for the irradiation reactor and with one or more outlet openings for discharging the fluid into the interior volume of the irradiation reactor or with one ore more inlet openings for feeding the fluid from the interior volume of the irradiation reactor into the fluid channel.

Preferably, the heat sink is combined with a radiation reflector such that the fluid channel is formed at an interface between the reflector and the heat sink.

Preferably, the fluid channel surrounds the opening of the heat sink and a central opening of the reflector through which radiation from the irradiation source can pass into the interior volume of the irradiation reactor.

Preferably, the outlet or inlet openings are arranged about a periphery of the reflector and communicate with the fluid channel.

Preferably, the irradiation device has an electrical interface for releasably electrically communicating terminals connected with the irradiation source on the substrate with corresponding terminals on the irradiation device. Preferably, the electrical interface comprises an electrically conductive spring arranged so as to bias the terminals apart from each other. Preferably, the substrate is accessible from an outside of the irradiation device once the fixation means is removed and is arranged so as to shield irradiation from escaping to the outside as long as it is located in the irradiation device.

Preferably, the fixation means comprises a nut, a bolt or a clamp releasably engaged with the irradiation device, preferably with the heatsink thereof, by a threaded connection, by a bayonet-type connection or by a snap-connection.

Preferably, the heat sink is made of stainless steel.

Preferably, the substrate is made of a heat conducting metal, preferably aluminium or copper.

Preferably, the irradiation device comprises a further heat sink, preferably in the form of ribs and/or an electrical fan, exposed to the outside and attached to the irradiation device so as to allow a heat transfer from the substrate to the further heat sink.

The invention thus also provides an irradiation reactor for treating a fluid, comprising:

a reactor body defining an interior volume for receiving the fluid to be treated, wherein the reactor body is, preferably made from PTFE at least on part of the internal surfaces exposed to radiation in operation, including a fluid inlet port for the fluid to be treated and a fluid outlet port for the treated fluid; and an irradiation device according to the invention, wherein the irradiation device is mounted to the reactor body such that the fluid channel of the irradiation device communicates with the fluid inlet or outlet port of the reactor body.

Preferably, the irradiation device is press-fit into an opening of the reactor body.

Preferably, the press-fit connection has protrusions formed on the irradiation device for cutting into the material of the reactor body.

BRIEF DESCRIPTION OF THE DRAWINGS

In the following the invention will be described on the basis of one preferred exemplary embodiment using the attached drawings as reference.

DETAILED DESCRIPTION OF THE INVENTION

Figure 1:
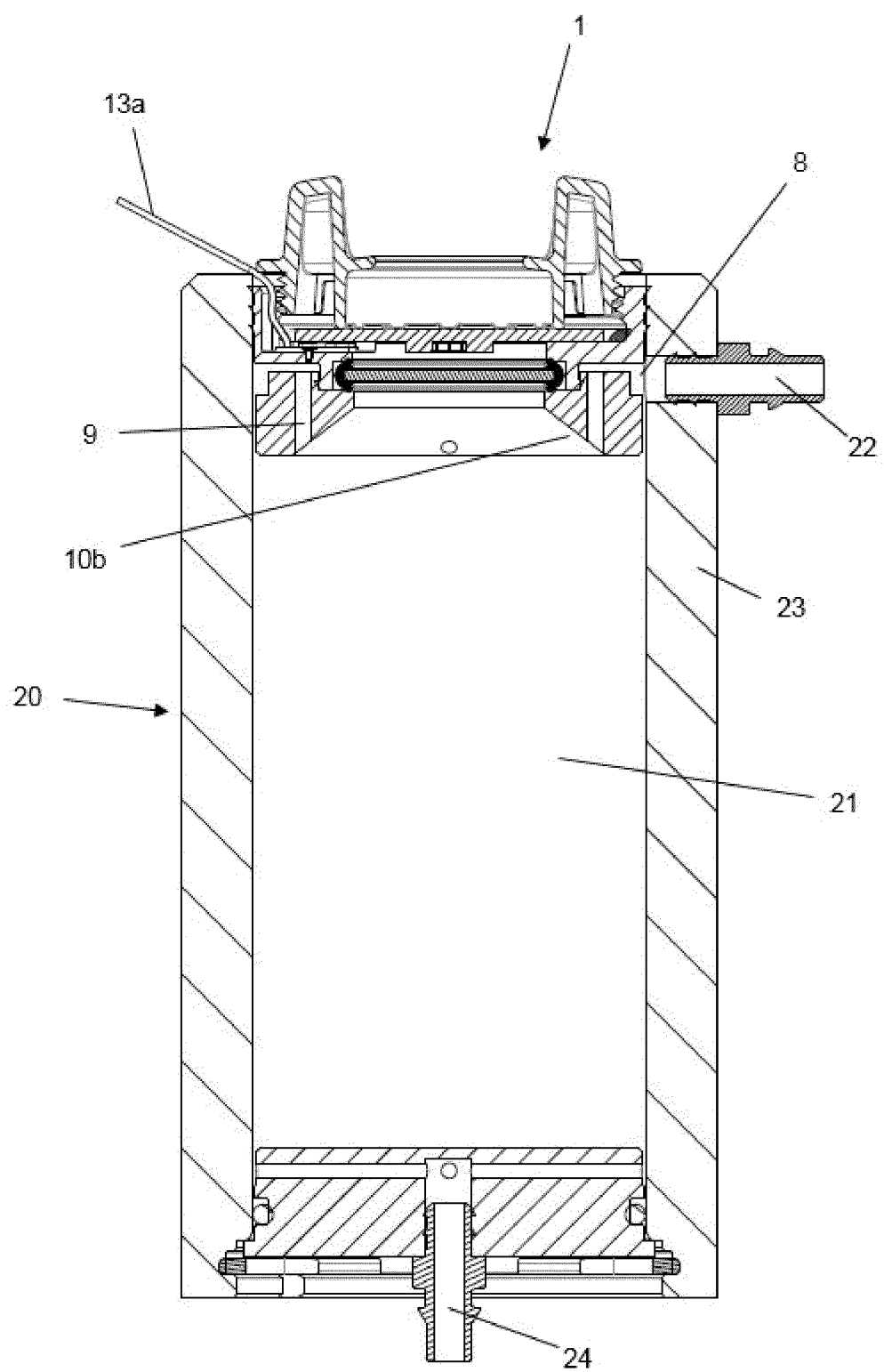
FIG. 1 shows the embodiment of the irradiation reactor with an irradiation device of the present invention in a cross section.
Figure 2:
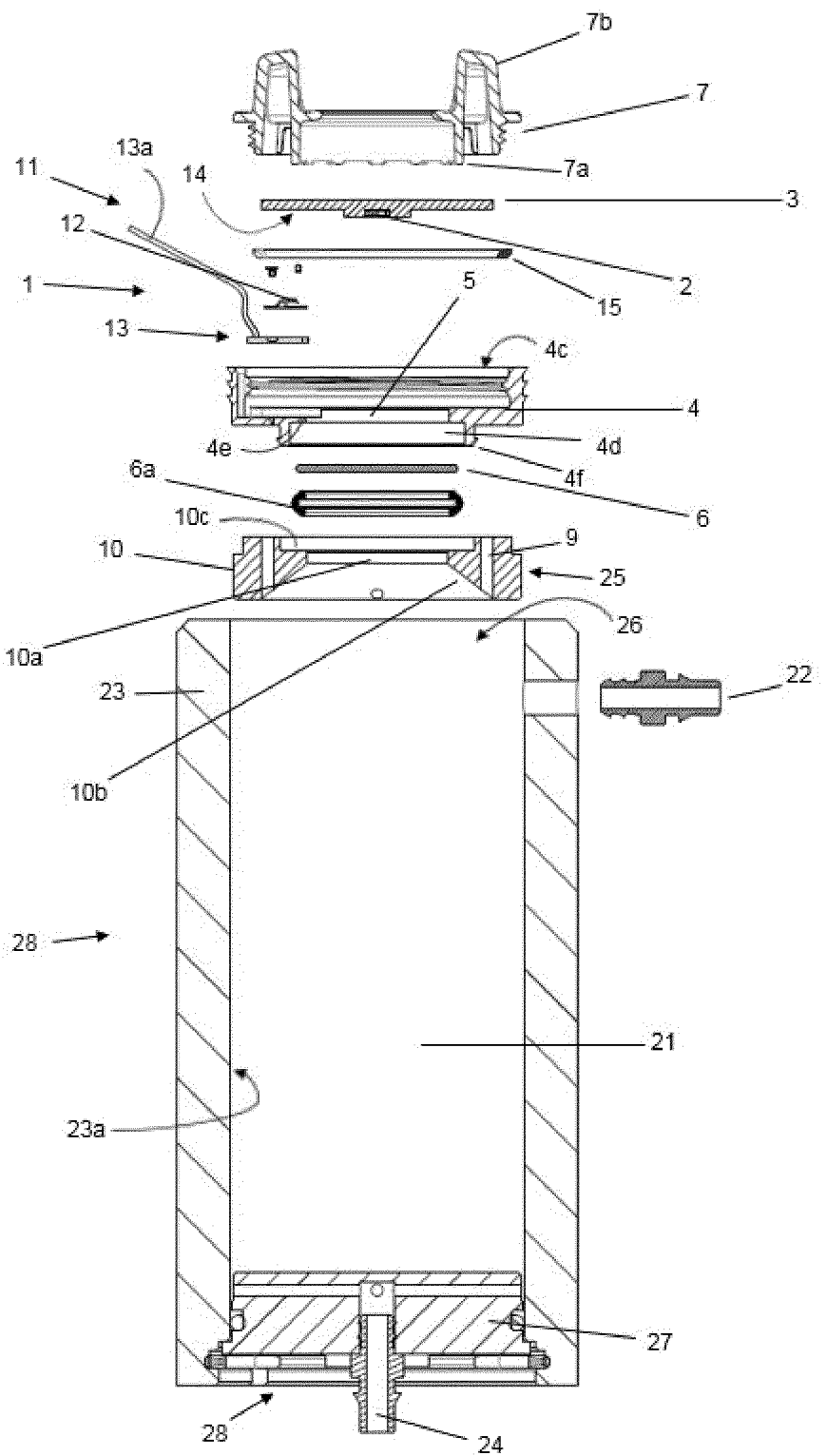
FIG. 2 shows the exploded view of the irradiation device and irradiation reactor shown in FIG. 1.
Figure 3:
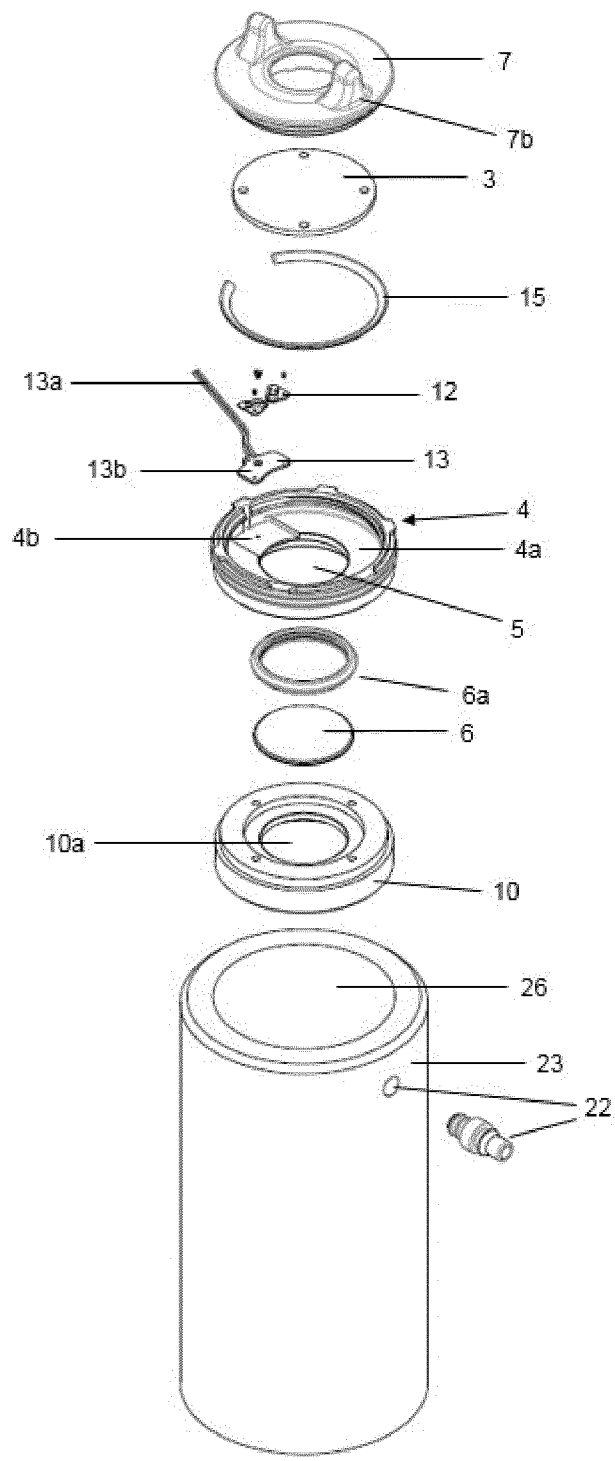
FIG. 3 shows a perspective exploded view of the irradiation device and irradiation reactor of FIG. 2.

An embodiment of an irradiation device according to the invention and of an irradiation reactor for treating a fluid to which the irradiation device can be mounted is described below in connection with FIGS. 1 to 3.

The irradiation device 1 is designed to be associated and mounted to an irradiation reactor 20 containing the fluid (for example water) to be treated by irradiation. The irradiation reactor of the example embodiment is a flow-through reactor through which the water flows from an inlet port to an outlet port while being exposed to the radiation.

The irradiation device of the invention can be, however, also used in connection with an irradiation reactor in the form of a storage vessel if the dimensions of the irradiation device are chosen so as to match those of an opening in such a vessel. In this use the fluid channel extending along and/or through the heat sink for communicating with the fluid inlet or outlet port (described later) may be used or may not be used, i.e. it may be inactive and simply closed once the irradiation device is mounted in the respective opening of the vessel or it may be omitted.

The flow-through irradiation reactor 20 of the exemplary embodiment comprises a reactor body 23 defining an internal volume 21 for receiving the fluid to be treated, a fluid inlet port (22 or 24) for introducing the fluid to be treated into the internal volume 21, and a fluid outlet port (22 or 24) for discharging the treated fluid out from the internal volume 21 to downstream circuitry.

Accordingly, in one embodiment, the flow-through irradiation reactor 20 comprises a reactor body 23 defining an internal volume 21 for receiving the fluid to be treated, a fluid inlet port (22) for introducing the fluid to be treated into the internal volume 21, and a fluid outlet port (24) for discharging the treated fluid out from the internal volume 21 to downstream circuitry. In another embodiment, the flow-through irradiation reactor 20 comprises a reactor body 23 defining an internal volume 21 for receiving the fluid to be treated, a fluid inlet port (24) for introducing the fluid to be treated into the internal volume 21, and a fluid outlet port (22) for discharging the treated fluid out from the internal volume 21 to downstream circuitry. In other words, in one embodiment, the fluid to be treated will pass through the reactor body 23 from top to bottom, whereas in another preferred embodiment the fluid will pass through the reactor body from bottom to top. The irradiation device 1 is mounted to one open end or opening 26 of the reactor body 23. While one irradiation device is shown in the example embodiment a second irradiation device of the same type can be provided at the opposite open end or opening 28 of the reactor body 23 in a similar manner as the one irradiation device 1 described in the example embodiment. The reactor body 23 thus can be a relatively simple cylindrical tube. The outlet or inlet port 24 can be integrated in a lid 27 closing the opposite open end or opening 28 of the reactor body 23 in a sealed manner as shown or can be provided on the reactor body 23.

The internal surface of the internal volume 21 of the reactor body 23 that is exposed to radiation in operation is at least partly made from PTFE (polytetrafluorethylen) in that it is made from PTFE material or is covered or coated with PTFE material because such material improves the reflection of the radiation in the envisaged UV wavelength range.

In the example embodiment the irradiation device 1 is pressed-fit into the opening 26 of the cylindrical reactor body 23 and the mechanical strength and fluid-tightness of the press-fit connection can be enhanced by providing protrusions 25 on the contact surface of the irradiation device 1 for cutting into the material of the reactor body. The irradiation device can be alternatively attached to the reactor body by a threaded engagement, by adhesive (alone or in combination with other measures) and/or suitable mechanical fasteners. The same type of connection can be provided for the lid 27 (or another irradiation device) at the opening 28 on the opposite end of the cylindrical reactor body 23.

The irradiation device 1 according to the invention is a self-contained structure or assembly that can be used together with different types of irradiation reactors, even those of the type where the fluid to be treated is stored in the internal volume and is not circulated or permanently flowing through the internal volume, i.e. a storage vessel.

The irradiation device 1 as an assembly is designed to be mounted to the irradiation reactor 20 and it comprises an irradiation source 2, preferably in the form of an UV-LED, more preferably an UV-C LED mounted on a heat conductive substrate 3. The LED is preferably packaged in a surface mounted device (SMD) and the SMD is preferably soldered onto a printed circuit board (PCB) made from a heat conducting metal like aluminum or copper and serving as the heat conductive substrate 3.

The substrate 3 is removably received in a recess portion 4c of a sleeve or disc-like heat sink 4 such that heat transfer from the substrate 3 to the heat sink 4 is possible mainly through a contact surface 4a (by conduction) and such that the irradiation from the irradiation source 2 (the LED) can pass through an opening 5 of the heat sink 4 into the interior volume 21 of the irradiation reactor 20 when the irradiation device 1 is mounted to the irradiation reactor 20. The opening 5 of the heat sink 4 is closed by a quartz window 6, the periphery of which is surrounded by an elastomer U-seal 6a in order to fluid-tightly integrate the window 6 into the heat sink 4. The disc-like heat sink 4 is preferably made from stainless steel but can be made from other materials that provide a good heat conduction and are resistant to the radiation and influences from the fluid to be treated. To adapt materials that have a good heat conduction they may be coated or covered at the respective exposed surfaces by another material that has the desired property.

The contact surface 4a is formed by a step-portion at the transition from the recess portion 4c holding the substrate 3 to the central opening 5 to which the irradiation passes. The window 6 made from quartz glass is arranged in another recess portion 4d and rests against a smaller step portion 4e on the side facing away from the recess portion 4c at the periphery of the opening 5 (see FIG. 2).

A fixation means 7, in the example embodiment in the form of a nut with an external thread, is threaded into an internal thread provided at the opening of the recess portion 4c of the heat sink 4 so as to releasably secure and bias the substrate 3 against the contact surface 4a of the heat sink 4. The nut has one or more axial protrusions 7a arranged to be brought in contact with the surface of the substrate 3 to introduce the biasing force. The nut 7 also has one or more external protrusions 7b facilitating the gripping of the nut by the hand of a user to untighten and remove the nut or designed to mechanically engage with and cooperate with a suitable tool allowing opening and removing of the nut.

The PCB or substrate 3 may be simply held in the recess portion 4c of the heat sink 4 by the biasing force of the nut 7 but may be additionally attached by an adhesive and/or by mechanical means including screws, rivets, pins etc. (not shown).

The irradiation device 1 has an electrical interface 11 for releasably electrically communicating terminals 14 connected with the irradiation source 2 with corresponding terminals 13 on the irradiation device 1. The releasable electrical interphase provides a possibility of simply removing the substrate with the LED as a replaceable unit after the nut 7 is removed from the recess portion 4c of the heat sink 4 without any further tool. This facilitates and accelerates the periodical replacement of the light source if spent or damaged. Since the recess portion 4c is sealed from the internal volume 21 of the reactor 20 by the heat sink 4 and the window 6, the replacement of the substrate does not create the risk of a contamination of any surfaces of the reactor or device exposed to the fluid to be treated or a damage to the fluid tightness of the reactor.

The electrical interface 11 preferably comprises one or more electrically conductive spring(s) 12 arranged so as to bias the terminals 13, 14 of the interface 11 apart from each other. The electrically conductive spring(s) 12 arranged between the terminals due to its/their elasticity increases the friction at the terminals and secures electrical contact during operation even if the irradiation device is exposed to vibrations and/or dimensional changes due to the influence of the heat. Further, the biasing force of the electrically conductive spring(s) 12 tends to lift off the substrate 3 from the electrical terminals of the irradiation device and the contact surface 4a, it facilitates gripping and removal of the substrate 3 during replacement. The electrically conductive spring 12 may be a cupro-nickel spring which combines electrical conductivity and mechanical stiffness.

The substrate 3 is arranged to be accessible from the outside once the nut 7 is removed and it is further arranged in an orientation that the light source 2 is located on the side surface of the substrate facing away from the nut 7 and the opening accessible to the user, thereby shielding the irradiation and preventing it from escaping to the outside in a situation where the electrical power to the irradiation device is not switched off. The provision of the electrically conductive spring 12 facilitates interrupting the electrical contact so that the operation of the light source is in any case interrupted once the substrate is lifted up a short distance, thereby providing another measure to protect the user from exposure to UV radiation.

Although the nut 7 is described as an example for the fixation means it may be alternatively in the form of a bolt, a cover or lid, or a clamp removably engaged with the heat sink by a threaded connection, by a bayonet-type connection or by a snap-connection. In other words, any releasable mechanical engagement that provides for the biasing of the substrate against the contact surface 4a of the heat sink can be used. The fixation means can be made from heat-conductive material like metal or the like or can be made from a heat-insulating material like plastics material or can be made from a compound providing insulative properties at portions designed to be touched by a user and heat conductive properties at other portions where additional heat dissipation and/or conduction to the outside is desired. The fixation means may accordingly include another heat sink, preferably in the form of ribs and/or an electrical fan exposed to the outside and attached to the device so as to allow a heat transfer from the substrate to the further heat sink via the fixation means.

The irradiation device 1 further has a fluid channel 8 extending along and/or through the heat sink 4, wherein the fluid channel 8 is arranged to communicate with the fluid inlet or outlet port 22 of the irradiation reactor 20 and with one or more outlet openings 9 for discharging the fluid into the interior volume 21 of the irradiation reactor 20 (when mounted to the irradiation reactor) or with one or more inlet openings 9 for feeding the fluid from the interior volume 21 of the irradiation reactor 20 into the fluid channel.

In other words, if port 22 communicating with the fluid channel 8 acts as inlet port, the openings 9 will act as outlet openings for discharging the fluid into the interior volume 21 of the irradiation reactor 20. In contrast, if port 22 communicating with the fluid channel 8 acts as outlet port, the openings 9 will act as inlet ports for feeding the fluid from the interior volume 21 of the irradiation reactor 20 into the fluid channel.

In a preferred embodiment port 22 acts as outlet port, port 24 acts as inlet port and the openings 9 act as inlet openings, i.e. the water flow is preferably from bottom to top.

The fluid channel 8 may be formed in the heat sink 4 as such (not shown) and may be preferably formed at an interface between a radiation reflector 10 that is combined with the heat sink 4, for example by a suitable mechanical combination that is either releasable or fixed (press-fit, gluing or welding or soldering, threaded engagement, snap-fit engagement). The fluid channel 8 formed in this manner is shown in FIG. 1 and it is formed by a defined axial gap at the interface between the heat sink 4 and the radiation reflector 10 that extends about the periphery on the outside of the central opening 5 of the heat sink 4 and the central opening 10a of the reflector 10 through which the radiation from the radiation source 2 can pass into the interior volume 21 of the irradiation reactor 20. The axial gap defining the fluid channel 8 can be realized by the cooperation of an axial skirt 4f surrounding the recess portion 4d accommodating window 6 and its seal 6a and a recess portion 10c on the side of the reflector 10 which are dimensioned to sufficiently compress the seal 6a to achieve the fluid-tightness of the window and retain a sufficient axial distance outside the recess portions to define the fluid channel. Alternatively the fluid channel 8 can be formed as a groove or grooves in facing surfaces of the reflector and the heat sink. At a position on the outer periphery corresponding to the fluid inlet or outlet port 22 of the reactor body 23 a fluid communication is established between the inlet or outlet port and the fluid channel 8.

In an alternative arrangement (not shown) the fluid inlet or outlet port 22 may be directly provided and connected with the irradiation device, i.e. on a part protruding from the reactor body, and may communicate with the fluid channel 8 extending along and/or through the heat sink 4.

The reflector 10 may be made from PTFE or may at least be covered or coated at the surfaces exposed to radiation with PTFE. The base of the reflector may be made from a heat conductive or non-conductive metal material or from a plastics material. The reflector is provided with a recess portion facing towards the interior volume 21 of the reactor body 23 and defining a reflecting surface 10b surrounding the central opening 10a.

The terminals 13 of the irradiation device 1 may be provided on a separate PCB 13b embedded in recess 4b of the contact surface 4a (see FIG. 3) such that the terminals thereof are flush with the surface of the contact surface 4a. The terminals 13 of the irradiation device may be connected to the outside via wires 13a (as shown) or wireless.

A seal ring or gasket 15 may be provided, if needed, between the substrate 3 and the heat sink 4.

The outlet or inlet openings 9 in the reflector 10 are evenly distributed and arranged about a periphery of the reflector 10 and communicate with the fluid channel 8. The distribution about the periphery provides the effect that the water flowing into the interior volume 21 or water flowing from the interior volume 21 into the fluid channel 8 is diffused and distributed more evenly so that bacteria contained in the fluid receive the necessary minimal lethal radiation dose from the exposure to the irradiation. This avoids zones in the internal volume that have stagnant fluid or slow travelling fluid bringing about the risk that not all bacteria in these portions are receiving the lethal dose of radiation.

The printed circuit board (PCB) of the substrate 3 (or another PCB connected therewith) may include additional electronic functions or circuitry like an RFID tag for storing information, a thermistor to monitor the PCB temperature and additional wireless electric data transmission means for exchanging data and information between the irradiation device and external devices.

The openings 9 distributed about the periphery of the reflector 10 and communicating with the fluid channel 8 might be formed in the heat sink 4 as such or in a separate component that is combined with the heat sink but does not necessarily fulfill the radiation reflecting function of the reflector, i.e. a component in the form of a simple ring connected with the heat sink.

The invention claimed is:

1. An irradiation device designed to be mounted to an irradiation reactor, comprising:
    an irradiation source, mounted on a heat conductive substrate;
    a heat sink configured to removably receive the conductive substrate such that heat transfer from the substrate to the heat sink is possible at a contact surface and such that the irradiation from the irradiation source can pass through an opening of the heat sink into an interior volume of the irradiation reactor when the irradiation device is mounted to the irradiation reactor, wherein the opening of the heat sink is closed by a quartz window;
    a mechanical engagement releasably biasing the substrate against the contact surface of the heat sink; and
    a fluid channel extending along and/or through the heat sink, wherein the fluid channel is arranged to communicate with a fluid inlet or outlet port of the irradiation reactor and with one or more outlet openings for discharging the fluid into the interior volume of the irradiation reactor or with one or more inlet openings for feeding the fluid from the interior volume of the irradiation reactor into the fluid channel;
    wherein the substrate is accessible from an outside of the irradiation device once the mechanical engagement is removed and is arranged so as to shield irradiation from escaping to the outside as long as it is located in the irradiation device.

2. The irradiation device according to claim 1, wherein the heat sink is combined with a radiation reflector such that the fluid channel is formed at an interface between the reflector and the heat sink.

3. The irradiation device according to claim 2, wherein the fluid channel surrounds the opening of the heat sink and a central opening of the reflector through which radiation from the irradiation source can pass into the interior volume of the irradiation reactor.

4. The irradiation device according to claim 2, wherein the outlet or inlet openings are arranged about a periphery of the reflector and communicate with the fluid channel.

5. The irradiation device according to claim 1, wherein the irradiation device has an electrical interface for releasably electrically communicating terminals connected with the irradiation source on the substrate with corresponding terminals on the irradiation device.

6. The irradiation device according to claim 5, wherein the electrical interface comprises an electrically conductive spring arranged so as to bias the terminals apart from each other.

7. The irradiation device according to claim 1, wherein the mechanical engagement comprises a nut, a bolt or a clamp releasably engaged with the irradiation device.

8. The irradiation device according to claim 1, wherein the heat sink is made of stainless steel.

9. The irradiation device according to claim 1, wherein the substrate is made of a heat conducting metal.

10. The irradiation device according to claim 1, wherein the irradiation device comprises a further heat sink, exposed to the outside and attached to the irradiation device so as to allow a heat transfer from the substrate to the further heat sink.

11. An irradiation reactor for treating a fluid, comprising:
    a reactor body defining an interior volume for receiving the fluid to be treated, and including a fluid inlet port for the fluid to be treated and a fluid outlet port for the treated fluid; and an irradiation device according to claim 1, wherein the irradiation device is mounted to the reactor body such that the fluid channel of the irradiation device communicates with the fluid inlet or outlet port of the reactor body.

12. The irradiation reactor according to claim 11, wherein the irradiation device is press-fit into an opening of the reactor body.

13. The irradiation reactor according to claim 12, wherein the press-fit connection has protrusions formed on the irradiation device for cutting into the material of the reactor body.

14. The irradiation device of claim 1, wherein said irradiation source is a UV-LED.

15. The irradiation device of claim 7, wherein said nut, bolt or clamp is releasably engaged with said heat sink of said irradiation device.

16. The irradiation device of claim 9, wherein said substrate is made of aluminium or copper.

17. The irradiation device of claim 10, wherein said further heat sink is in the form of ribs and/or an electrical fan.

18. The irradiation reactor of claim 11, wherein the reactor body is made from PTFE at least on part of the internal surfaces exposed to radiation in operation.

19. The irradiation device of claim 1, wherein said heat sink is disk-shaped.

20. The irradiation device according to claim 1, wherein the mechanical engagement is carried out by a threaded connection, by a bayonet connection or by a snap-connection.

* * * * *